United States Patent
Strandborg et al.

(10) Patent No.: US 11,055,879 B1
(45) Date of Patent: Jul. 6, 2021

(54) ENCODER AND ENCODING METHOD FOR MITIGATING DISCREPANCIES IN RECONSTRUCTED IMAGES

(71) Applicant: Varjo Technologies Oy, Helsinki (FI)

(72) Inventors: Mikko Strandborg, Hangonkylä (FI); Ville Miettinen, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 16/839,601

(22) Filed: Apr. 3, 2020

(51) Int. Cl.
  *G06K 9/36* (2006.01)
  *G06T 9/20* (2006.01)
  *G06T 7/50* (2017.01)
  *G06T 7/13* (2017.01)

(52) U.S. Cl.
  CPC .................. *G06T 9/20* (2013.01); *G06T 7/13* (2017.01); *G06T 7/50* (2017.01)

(58) Field of Classification Search
  CPC ....... H04N 19/00278; H04N 19/00951; H04N 7/26; H04N 19/00587; H04N 19/0063; H04N 5/23251; G06K 9/36; G06T 3/602; G06T 9/00; G06T 9/20; G06T 7/50; G06T 7/13
  See application file for complete search history.

(56) References Cited

U.S. PATENT DOCUMENTS

| | | | | |
|---|---|---|---|---|
| 2011/0255592 A1* | 10/2011 | Sung | ............... | H04N 19/597 375/240.02 |
| 2013/0101039 A1* | 4/2013 | Florencio | ............... | H04N 19/20 375/240.16 |
| 2014/0269935 A1* | 9/2014 | Gaddy | ............... | H04N 19/597 375/240.25 |
| 2015/0245062 A1* | 8/2015 | Shimizu | ............... | H04N 19/597 375/240.15 |
| 2017/0188002 A1* | 6/2017 | Chan | ............... | H04N 13/122 |

* cited by examiner

*Primary Examiner* — Duy M Dang
(74) *Attorney, Agent, or Firm* — Ziegler IP Law Group, LLC

(57) ABSTRACT

An encoder including data processing arrangement configured to analyze depth information pertaining to input image to identify depth edge(s) and to determine location of depth edge(s); analyze input image to identify edges of objects and to determine locations of said edges; select, amongst edges in input image, matching edge(s) whose location matches with location of depth edge(s); obtain intermediate decoded image by decoding intermediate encoded image obtained from intermediate encoding of input image; analyze intermediate decoded image to identify edges of objects and to determine locations of said edges; determine edge(s) in intermediate decoded image that corresponds to matching edge(s); modify pixel values in input image and/or optical depths in depth information, based on difference in location of determined edge(s) in intermediate decoded image and location of matching edge(s); and encode input image and depth information, upon said modification, to generate encoded data.

16 Claims, 5 Drawing Sheets

ENCODER AND ENCODING METHOD FOR MITIGATING DISCREPANCIES IN RECONSTRUCTED IMAGES

TECHNICAL FIELD

The present disclosure relates generally to image encoding; and more specifically, to encoders comprising data processing arrangements. Moreover, the present disclosure also relates to encoding methods implemented by the aforesaid encoders.

BACKGROUND

Image encoding and decoding is used in various domains (for example, such as extended-reality imaging, three-dimensional modelling, medical imaging, and the like). Generally, when an image is to be encoded, information pertaining to the image is encoded. This information includes, for example, color information, intensity information, depth information, transparency information, and the like, pertaining to the image. When the image is to be decoded, the encoded information is decoded to generate decoded information. The decoded information is used to generate a decoded image, which is a reconstruction of the image.

Presently, different types of information pertaining to the image are encoded into different framebuffers, in order to an amount of storage and transmission resources that are required for the image. Typically, lossy encoding techniques (for example, such as High Efficiency Video Coding (HEVC)) are employed for performing encoding. As a result, the different framebuffers include subtle errors introduced by encoding artifacts. When lossily encoded information is decoded to generate the decoded information, these subtle errors are propagated in the decoded information. When the decoded information is used to generate the decoded image, and more optionally, generate warped images from the decoded image, the errors are amplified further, especially along discontinuities in the decoded image.

FIG. 1A (Prior Art) is an illustration of an exemplary decoded image that is generated upon decoding a given encoded image, the given encoded image being generated upon conventionally encoding a given image in a near lossless manner; FIG. 1B (Prior Art) is an illustration of an exemplary decoded depth image that is generated upon decoding an encoded depth image, the encoded depth image being generated upon conventionally encoding a depth image pertaining to the given image in a lossy manner; FIG. 10 (Prior Art) is an illustration of how an exemplary spacewarped image is to be generated for a given head pose of a user; and FIG. 1D (Prior Art) is an illustration of the exemplary spacewarped image, the exemplary spacewarped image being generated based on the exemplary decoded image and the exemplary decoded depth image. FIGS. 1A-1D represent prior art.

With reference to FIG. 1A, the exemplary decoded image represents a circular object in its central portion and a background in its remaining portion. Notably, pixels having slanting hatches represent those pixels of the circular object for which correct pixel values are obtained upon decoding the given encoded image, pixels having horizontal dashed hatches represent those pixels of background for which incorrect pixel values are obtained upon decoding the given encoded image, and pixels having no hatches (notably, blank pixels) represent those pixels of background for which correct pixel values are obtained upon decoding the given encoded image.

With reference to FIG. 1B, the exemplary decoded depth image represents optical depths of the circular object and the background. The optical depth of the circular object is depicted by way of dotted hatched pixels, whereas the optical depth of the background is depicted by way of slanting hatched pixels, the optical depth of the background being greater than the optical depth of the circular object. As shown, the decoded depth image includes some optical depth errors along a left depth edge of the circular object, the optical depth errors being introduced upon conventionally encoding the depth image in the lossy manner.

With reference to FIG. 1C, when generating the exemplary spacewarped image, it can be noted that a left edge of the circular object represented in the exemplary decoded image does not match with the left depth edge of the circular object. For the given head pose, the circular object and the background are offset towards the right, but due to parallax, the circular object appears to be offset to a greater extent than the background. As a result, there emerge pixels (depicted as cross hatched pixels) for which pixel values are to be filled in, as these pixels were occluded (behind the circular object) in the exemplary decoded image.

With reference to FIG. 1D, in the exemplary spacewarped image, the pixel values of the cross hatched pixels of FIG. 10 are filled in using pixel values in the exemplary decoded image, based on optical depths in the exemplary decoded depth image. The pixel values of the cross hatched pixels are determined to be equal to pixel values of pixels lying on a left side of the cross hatched pixels, as optical depths of the cross hatched pixels would be similar to optical depths of the pixels lying on the left side of the cross hatched pixels (when taking into account the offset and optical depths in the exemplary decoded depth image). The pixel values of the cross hatched pixels are filled in incorrectly, as optical depth errors are present in the exemplary decoded depth image. Such incorrect filling-in of the pixel values causes an undesirable stretching of the circular object in the exemplary spacewarped image.

Conventional encoders are unable to mitigate, or even compensate for errors that are introduced when lossy encoding is employed. As a result, these errors propagate into the decoded image, and more optionally, into the warped images generated from the decoded image. Moreover, cross modal discrepancies across different types of encoded information cause further amplification of these errors. As an example, optical depth errors due to encoding can cause, upon decoding, discrepancies between locations of depth edges of objects at different optical depths and locations of edges of the objects. In such an example, pixel values of a pixel corresponding to a first object at a first optical depth would incorrectly bleed into a pixel corresponding to a second object at a second optical depth, the first optical depth being different from the second optical depth. Such pixel bleeding is likely to cause undesirable stretching or distortion of objects.

Therefore, in light of the foregoing discussion, there exists a need to overcome the aforementioned drawbacks associated with conventional encoders.

SUMMARY

The present disclosure seeks to provide an encoder. The present disclosure also seeks to provide a method. The present disclosure seeks to provide a solution to the existing problem of discrepancies that are introduced in decoded images (namely, reconstructed images) that are obtained upon decoding conventionally encoded data. An aim of the present disclosure is to provide a solution that overcomes at least partially the problems encountered in prior art, and provides an encoder and encoding method that generates the encoded data in a manner that compensates for possible discrepancies in decoded data, thereby effectively mitigating discrepancies in the decoded data.

In one aspect, an embodiment of the present disclosure provides an encoder comprising a data processing arrangement configured to:
  analyze depth information pertaining to an input image to identify at least one depth edge at which a change in a function of an optical depth satisfies a first predefined criterion and to determine a location of the at least one depth edge, wherein the depth information is indicative of optical depths of objects and portions of the objects represented in the input image;
  analyze the input image to identify edges of the objects represented in the input image and to determine locations of the edges in the input image;
  select, from amongst the edges identified in the input image, at least one matching edge in the input image whose location matches with the location of the at least one depth edge;
  obtain an intermediate decoded image by decoding an intermediate encoded image obtained from intermediate encoding of the input image;
  analyze the intermediate decoded image to identify edges of objects represented in the intermediate decoded image and to determine locations of the edges in the intermediate decoded image;
  determine at least one edge from amongst the edges identified in the intermediate decoded image that corresponds to the at least one matching edge in the input image;
  modify pixel values in the input image and/or optical depths in the depth information, based on a difference in a location of the at least one edge in the intermediate decoded image and the location of the at least one matching edge in the input image; and
  encode the input image and the depth information, upon modification of the pixel values in the input image and/or the optical depths in the depth information, to generate encoded data.

In another aspect, an embodiment of the present disclosure provides a method comprising:
  analyzing depth information pertaining to an input image to identify at least one depth edge at which a change in a function of an optical depth satisfies a first predefined criterion and to determine a location of the at least one depth edge, wherein the depth information is indicative of optical depths of objects and portions of the objects represented in the input image;
  analyzing the input image to identify edges of the objects represented in the input image and to determine locations of the edges in the input image;
  selecting, from amongst the edges identified in the input image, at least one matching edge in the input image whose location matches with the location of the at least one depth edge;
  obtaining an intermediate decoded image by decoding an intermediate encoded image obtained from intermediate encoding of the input image;
  analyzing the intermediate decoded image to identify edges of objects represented in the intermediate decoded image and to determine locations of the edges in the intermediate decoded image;
  determining at least one edge from amongst the edges identified in the intermediate decoded image that corresponds to the at least one matching edge in the input image;
  modifying pixel values in the input image and/or optical depths in the depth information, based on a difference in a location of the at least one edge in the intermediate decoded image and the location of the at least one matching edge in the input image; and
  encoding the input image and the depth information, upon modification of the pixel values in the input image and/or the optical depths in the depth information, into encoded data.

Embodiments of the present disclosure substantially eliminate or at least partially address the aforementioned problems in the prior art, and enable mitigation of discrepancies in decoded data that is obtained upon decoding the encoded data.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 4C is an illustration of how a warped output image is to be generated for a given head pose of a user; while

Figure 1A:
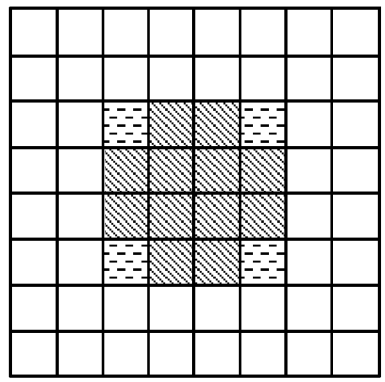
FIG. 1A (Prior Art) is an illustration of an exemplary decoded image that is generated upon decoding a given encoded image, the given encoded image being generated upon conventionally encoding a given image in a near lossless manner.
Figure 1B:
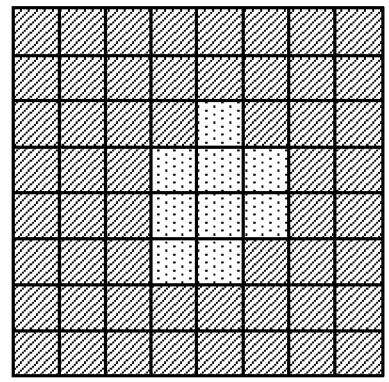
FIG. 1B (Prior Art) is an illustration of an exemplary decoded depth image that is generated upon decoding an encoded depth image, the encoded depth image being generated upon conventionally encoding a depth image pertaining to the given image in a lossy manner.
Figure 1C:
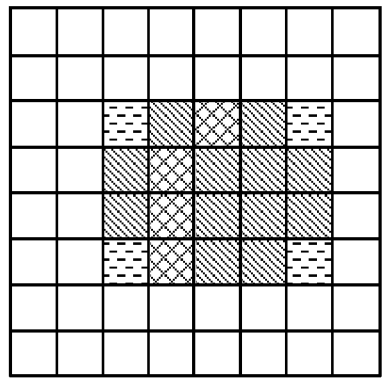
FIG. 1C (Prior Art) is an illustration of how an exemplary spacewarped image is to be generated for a given head pose of a user.
Figure 1D:
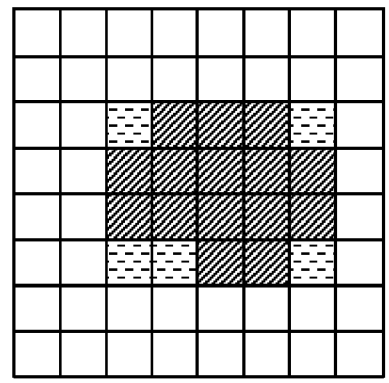
FIG. 1D (Prior Art) is an illustration of the exemplary spacewarped image, the exemplary spacewarped image being generated based on the exemplary decoded image and the exemplary decoded depth image.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides an encoder comprising a data processing arrangement configured to:

analyze depth information pertaining to an input image to identify at least one depth edge at which a change in a function of an optical depth satisfies a first predefined criterion and to determine a location of the at least one depth edge, wherein the depth information is indicative of optical depths of objects and portions of the objects represented in the input image;

analyze the input image to identify edges of the objects represented in the input image and to determine locations of the edges in the input image;

select, from amongst the edges identified in the input image, at least one matching edge in the input image whose location matches with the location of the at least one depth edge;

obtain an intermediate decoded image by decoding an intermediate encoded image obtained from intermediate encoding of the input image;

analyze the intermediate decoded image to identify edges of objects represented in the intermediate decoded image and to determine locations of the edges in the intermediate decoded image;

determine at least one edge from amongst the edges identified in the intermediate decoded image that corresponds to the at least one matching edge in the input image;

modify pixel values in the input image and/or optical depths in the depth information, based on a difference in a location of the at least one edge in the intermediate decoded image and the location of the at least one matching edge in the input image; and encode the input image and the depth information, upon modification of the pixel values in the input image and/or the optical depths in the depth information, to generate encoded data.

In another aspect, an embodiment of the present disclosure provides a method comprising:

analyzing depth information pertaining to an input image to identify at least one depth edge at which a change in a function of an optical depth satisfies a first predefined criterion and to determine a location of the at least one depth edge, wherein the depth information is indicative of optical depths of objects and portions of the objects represented in the input image;

analyzing the input image to identify edges of the objects represented in the input image and to determine locations of the edges in the input image;

selecting, from amongst the edges identified in the input image, at least one matching edge in the input image whose location matches with the location of the at least one depth edge;

obtaining an intermediate decoded image by decoding an intermediate encoded image obtained from intermediate encoding of the input image;

analyzing the intermediate decoded image to identify edges of objects represented in the intermediate decoded image and to determine locations of the edges in the intermediate decoded image;

determining at least one edge from amongst the edges identified in the intermediate decoded image that corresponds to the at least one matching edge in the input image;

modifying pixel values in the input image and/or optical depths in the depth information, based on a difference in a location of the at least one edge in the intermediate decoded image and the location of the at least one matching edge in the input image; and encoding the input image and the depth information, upon modification of the pixel values in the input image and/or the optical depths in the depth information, into encoded data.

The present disclosure provides the aforementioned encoder and the aforementioned method. The data processing arrangement of the encoder is configured to perform specialized data processing operations pertaining to data encoding, to compensate for possible pixel value errors that would arise upon lossy encoding of the input image. This compensation is made in the pixel values in the input image and/or the optical depths in the depth information, prior to encoding the input image and the depth information. Said modification is done based on the aforesaid analysis of the intermediate decoded image, wherein the difference in the location of the at least one edge in the intermediate decoded image and the location of the at least one matching edge in the input image is indicative of possible inconsistencies that would arise between depth edges and edges of the objects if the input image and the depth information were encoded in a conventional manner. As these inconsistences are compensated for, prior to encoding, when the encoded data is decoded, optical depths along depth edges would be consistent with pixel values along edges of objects, even if some pixel value errors get introduced. Moreover, cross modal consistency of errors across decoded data (obtained at a decoder) suppresses further amplification of the errors. As an example, bleeding of incorrect pixel values across objects lying at different optical depths is effectively mitigated. Resultantly, undesirable stretching or distortion of the objects does not occur.

Throughout the present disclosure, the term "encoder" refers to specialized equipment that, in operation, encodes data. Such data includes, but is not limited to, images and information pertaining to said images. The encoder encodes the input image and the depth information pertaining to the input image, upon modification of the pixel values in the input image and/or the optical depths in the depth information, to generate the encoded data.

It will be appreciated that the encoded data is compensated for possible pixel value errors that would arise upon lossy encoding of the input image, said compensation being done by way of modifying the pixel values in the input image and/or the optical depths in the depth information prior to encoding the input image and the depth information to generate the encoded data. It will also be appreciated that the encoded data requires lesser storage and transmission resources as compared to unencoded data. The encoded data can be communicated from the encoder to a decoder in a bandwidth-efficient manner.

Throughout the present disclosure, the term "data processing arrangement" refers to hardware, software, firmware or a combination of these, that is configured to implement data processing operations pertaining to data encoding. In particular, the data processing arrangement is configured to execute data processing operations pertaining to generation of the encoded data. Optionally, the data processing arrangement of the encoder is implemented by employing at least one Reduced Instruction Set Computing (RISC) processor that is operable to execute the aforesaid data processing operations.

Optionally, the data processing arrangement is implemented as a first processing hardware and a second processing hardware for processing the input image and the depth information, respectively. In such case, the data processing operations are shared between the first processing hardware and the second processing hardware. This reduces computational burden on both processing hardware.

Alternatively, optionally, the data processing arrangement is implemented as a single processing hardware for processing the input image and the depth information.

Throughout the present disclosure, the "depth information" pertaining to the input image refers to information indicative of the optical depths of the objects and the portions of the objects represented in the input image. Optionally, the depth information pertaining to the input image is in form of a depth map or a voxel map.

Throughout the present disclosure, the term "depth map" refers to a data structure comprising the depth information. In an embodiment, the depth map is an array of optical depth values associated with the input image, wherein a given element of the array corresponds to an optical depth value of a given pixel of the input image, the given pixel representing a given object or a portion of the given object. In another embodiment, the depth map is a depth image comprising a plurality of pixels, wherein a colour of each pixel indicates optical depth of its corresponding region within the input image.

Furthermore, the term "voxel map" refers to a data structure comprising a plurality of three-dimensional volume elements that constitute a given scene represented by the input image, wherein each three-dimensional volume element represents a three-dimensional region within the given scene. A given three-dimensional volume element is indicative of the optical depth of its corresponding region within the given scene.

The depth information is analyzed to identify the at least one depth edge at which the change in the function of the optical depth satisfies the first predefined criterion and to determine the location of the at least one depth edge. The "function of the optical depth" defines a manner in which optical depth varies across pixels in the input image. Optionally, the function of the optical depth comprises at least one gradient of optical depths and at least one depth discontinuity. A given gradient of optical depths could be a linear gradient or a non-linear gradient.

Throughout the present disclosure, the term "depth edge" refers to a location in the depth information where the change in the function of the optical depth satisfies the first predefined criterion. Notably, a given depth edge is a location in the depth information where optical depths of contiguous (namely, adjacent) pixels changes abruptly. Such a location, for example, corresponds to an edge of a given object or an edge of a portion of the given object. The given depth edge is an edge in the depth information where optical depths associated with one side of the given depth edge are substantially different from optical depths associated with the other side of the given depth edge. The given depth edge can be understood to be a depth discontinuity in the depth information.

In an embodiment, the change in the function of the optical depth satisfies the first predefined criterion at a given location when:
  an absolute change in optical depths of contiguous pixels at the given location lies above a first threshold, and
  a Laplacian (namely, second partial derivative) of the input image at the given location lies above a second threshold.

Optionally, the first threshold and/or the second threshold are adjustable. The first threshold and/or the second threshold are defined by a manufacturer of the encoder or are selected by the data processing arrangement.

In another embodiment, the change in the function of the optical depth satisfies the first predefined criterion at a given location when:
  a first difference between optical depths of a first pixel and a second pixel is not equal to a second difference between optical depths of a third pixel and a fourth pixel, wherein the first pixel, the second pixel, the third pixel and the fourth pixel are arranged sequentially, the given location lying between the second pixel and the third pixel; and
  at the given location, a first line passing through the first and second pixels does not intersect a second line passing through the third and fourth pixels, wherein a slope of the first line is proportional to the first difference and a slope of the second line is proportional to the second difference.

In yet another embodiment, the change in the function of the optical depth satisfies the first predefined criterion at a given location when an absolute difference in optical depths of two contiguous pixels at the given location lies above a predefined threshold. Optionally, the predefined threshold is adjustable, the predefined threshold being defined by the manufacturer of the encoder or being selected by the data processing arrangement.

For illustration purposes only, there will now be considered an example implementation wherein P1 is an optical depth of a first pixel at a location (x,y) in the input image, P2 is an optical depth of a second pixel at a location (x+1,y) in the input image, P3 is an optical depth of a third pixel at a location (x+2,y) in the input image, and P4 is an optical depth of a fourth pixel at a location (x,y) in the input image. The first pixel, the second pixel, the third pixel and the fourth pixel are arranged sequentially. In such a case, a first difference $\Delta Ax$ in optical depths of the first and second pixels may be equal to P2-P1 and a second difference $\Delta Bx$ in optical depths of the third and fourth pixels may be equal to P4-P3. A given edge between the second pixel and the third pixel may, for example, be a depth edge if only if: $\Delta Ax$ is not equal to $\Delta Bx$; and at the given edge, a first line passing through the first and second pixels does not intersect a second line passing through the third and fourth pixels, wherein a slope of the first line equals ΔAx divided by a distance between the first and second pixels, while a slope of the second line equals ΔBx divided by a distance between the third and fourth pixels.

The input image is analyzed to identify the edges of the objects represented in the input image and to determine locations of the edges in the input image. Optionally, the data processing arrangement is configured to employ at least one edge-detection algorithm to identify the edges of the objects represented in the input image. Examples of the at least one edge-detection algorithm include, but are not limited to, a Canny edge detector, a Deriche edge detector, a Sobel edge detector, and a Prewitt edge detector. Edge-detection algorithms are well-known in the art.

Optionally, a common edge of contiguous pixels in the input image is identified as an edge of a given object or a portion of the edge of the given object, when a difference between pixel values of the contiguous pixels lies above a predefined threshold. Said predefined threshold may be defined by a manufacturer of the encoder or may be selected by the data processing arrangement. It will be appreciated that said predefined threshold is adjustable to obtain a required visual result pertaining to the identification of the edges of the objects.

Throughout the present disclosure, the "pixel value" of a given pixel refers to a resultant intensity of the given pixel, wherein the resultant intensity of the given pixel is an additive total of intensity values of all constituent color channels of the given pixel. The resultant intensity of the given pixel is indicative of a color of the given pixel and a brightness of the given pixel.

As an example, a common edge of two contiguous pixels may be identified as an edge of a given object when a pixel value of a first pixel on a first side of the common edge is '496' (specifically, an additive total of intensity values '64', '224' and '208' of a red color channel, a blue color channel and a green color channel, respectively, of the first pixel), whereas a pixel value of a second pixel on a second side of the common edge is '320' (specifically, an additive total of intensity values '200', '15' and '105' of a red color channel, a blue color channel and a green color channel, respectively, of the second pixel). In such a case, the difference between pixel values of the first and second pixels may lie above a predefined threshold of 150 units. Notably, the pixel value of the first pixel indicates a turquoise color of the first pixel and 65.9 percent brightness of the first pixel, whereas the pixel value of the second pixel indicates a ruby color of the second pixel and 78 percent brightness of the second pixel. In this example, the brightness values are provided according to a scale where black color has 0 percent brightness and white color has 100 percent brightness.

From amongst the edges identified in the input image, there is selected at least one matching edge in the input image whose location matches with the location of the at least one depth edge. Herein, the term "matching edge" refers to an edge in the input image whose location matches with the location of the at least one depth edge. Optionally, the data processing arrangement is configured to compare the locations of the edges in the input image with the location of the at least one depth edge. Only those edges in the input image whose locations match the location of the at least one depth edge are selected as the at least one matching edge. Throughout the present disclosure, the term "matches" encompasses exact matches, as well as near-exact matches. In near-exact matches, characteristics being matched (for example, locations) lie within a matching threshold from each other. The matching threshold may be defined by the manufacturer of the encoder or may be selected by the data processing arrangement. For example, the matching threshold for matching locations of two given entities (for example, two given edges) may be equal to ten pixels.

Then, the intermediate decoded image is obtained by decoding the intermediate encoded image obtained from intermediate encoding of the input image. The term "intermediate encoded image" refers to an image that is obtained upon intermediately encoding the input image, whereas the term "intermediate decoded image" refers to an image that is obtained upon intermediately decoding the intermediate encoded image. It will be appreciated that encoding the input image to obtain the intermediate encoded image, and decoding the intermediate encoded image to obtain the intermediate decoded image are performed as intermediate processing steps in an overall process of encoding implemented by the encoder.

Optionally, the data processing arrangement is configured to intermediately encode the input image into the intermediate encoded image in a lossy manner. Optionally, in this regard, the data processing arrangement employs a lossy encoding algorithm to generate the intermediate encoded image. Notably, some pixel value detail of the input image is lost while generating the intermediate encoded image in the lossy manner. Correspondingly, the intermediate decoded image has some pixel value errors. The intermediate decoded image represents the same objects and portions of the objects represented in the input image, but with some pixel value errors that arise out of the lossy manner of encoding used to obtain the intermediate encoded image.

It will be appreciated that the intermediate decoded image is an intermediate reconstruction of the input image. Notably, the intermediate decoded image represents how the input image would be reconstructed upon decoding, if the input image were optionally encoded in a lossy manner. The intermediate decoded image is used in estimating possible inconsistencies that would arise between depth edges and edges of the objects in the encoded data if the input image and the depth information were encoded in a conventional manner.

Optionally, the data processing arrangement is configured to intermediately decode the intermediate encoded image into the intermediate decoded image in a lossy manner. In this case, additional pixel value errors would be introduced in the intermediate decoded image on account of the lossy manner of decoding. Alternatively, optionally, the data processing arrangement is configured to intermediately decode the intermediate encoded image into the intermediate decoded image in a lossless manner or a near lossless manner.

The intermediate decoded image is analyzed to identify the edges of the objects represented in the intermediate decoded image and to determine the locations of the edges in the intermediate decoded image. Optionally, the data processing arrangement is configured to employ at least one edge detection algorithm to identify the edges of the objects represented in the intermediate decoded image. Edge-detection algorithms are well-known in the art.

Optionally, a common edge of contiguous pixels in the intermediate decoded image is identified as an edge of a given object or a portion of the edge of the given object, when a difference between pixel values of the contiguous pixels lies above a predefined threshold. Said predefined threshold may be defined by a manufacturer of the encoder or may be selected by the data processing arrangement.

Optionally, when the intermediate decoded image is associated with some pixel value errors, locations of one or more edges from amongst the edges identified in the intermediate decoded image are different from locations of corresponding edges identified in the input image.

Optionally, the data processing arrangement is configured to compare pixel values in the intermediate decoded image with pixel values in the input image to identify at least one pixel value error in the intermediate decoded image. A pixel value error is identified when a pixel value of a given pixel in the intermediate decoded image does not match a pixel value of a corresponding pixel in the input image.

At least one edge from amongst the edges identified in the intermediate decoded image that corresponds to the at least one matching edge in the input image is determined. Optionally, in this regard, the data processing arrangement is configured to compare attributes of the edges identified in the intermediate decoded image with attributes of the at least one matching edge in the input image, wherein a given edge in the intermediate decoded image is determined to correspond to a given matching edge in the input image when the given edge and the given matching edge have at least one matching attribute. Optionally, attributes of a given edge comprises: a shape of the given edge, a length of the given edge, a location of the given edge, an orientation of the given edge.

The pixel values in the input image and/or the optical depths in the depth information are modified, based on the difference in the location of the at least one edge in the intermediate decoded image and the location of the at least one matching edge in the input image. When the location of the at least one edge in the intermediate decoded image matches the location of the at least one matching edge in the input image, the pixel values in the input image and/or the optical depths in the depth information are not modified. In such a case, in the encoded data, edges of objects and their corresponding depth edge(s) would be consistent, in spite of any possible pixel value errors that are introduced at the time of encoding. Alternatively, when the location of the at least one edge in the intermediate decoded image does not match the location of the at least one matching edge in the input image, the pixel values in the input image and/or the optical depths in the depth information are modified to compensate for said mismatch.

In an example, the pixel values in the input image may be modified in a manner that a pixel value of a given pixel lying along the at least one matching edge in the input image is replicated for all pixels that are interposed between the location of the at least one matching edge and the location of the at least one edge in the intermediate decoded image. Such modification of pixel values of the interposed pixels is a compensation that is made to match edge contours of the intermediate decoded image with depth contours in the depth information.

In another example, the optical depths in the depth information may be modified in a manner that an optical depth value of a given pixel lying along the at least one matching edge in the input image is replicated for all pixels that are interposed between the location of the at least one matching edge and the location of the at least one edge in the intermediate decoded image. Such modification of optical depth values of the interposed pixels is a compensation that is made to match depth contours in the depth information with edge contours of the intermediate decoded image.

In yet another example, both the pixel values in the input image and the optical depths in the depth information may be modified to match edge contours of the intermediate decoded image and depth contours in the depth information.

Notably, the pixel values in the input image and/or the optical depths in the depth information are modified to compensate for possible pixel value errors that would have been introduced upon encoding the input image in a lossy manner without said compensation. Moreover, the lossy encoding of the input image having high color-contrast edges would produce color artifacts at the edges of objects. Without said modification, the edges of objects and their corresponding depth edge(s) would be inconsistent, due to possible pixel value errors that are introduced at the time of encoding. This modification is an error-compensation data processing operation that is made prior to encoding the input image and the depth information to generate the encoded data. It will be appreciated that said modification enables consistency between the depth edges and the edges of the objects. In other words, the pixel values in the input image and/or the optical depths in the depth information are modified to implement cross-modal error consistency across the decoded data. As a result of such cross-modal error consistency, in the decoded data, bleeding of incorrect pixel values across objects lying at different optical depths is effectively mitigated. Resultantly, undesirable stretching or distortion of the objects does not occur.

The input image and the depth information is encoded, upon modification of the pixel values in the input image and/or the optical depths in the depth information, to generate the encoded data. The encoded data is compensated for possible pixel value errors that would have been introduced upon encoding the input image in a lossy manner without said compensation, and specifically, for pixel value errors that would have been introduced along the at least one matching edge.

Optionally, the pixel values in the input image and/or the optical depths in the depth information are modified, based also on a pixel density of a display or projector that is to be employed to render a final decoded image (described later). The pixel density of the display or projector is commonly known as a "display resolution" of the display or projector. Higher the pixel density of the display or projector, greater is the number of pixels in the input image and/or optical depths in the depth information that need to be modified. For displays or projectors having high pixel densities, the number of pixels that are interposed between the location of the at least one matching edge and the location of the at least one edge in the intermediate decoded image is also high, and vice versa.

In an example, when a pixel density of a given display or projector is 60 pixels per degree, pixel values for 10 pixels (that are interposed between the location of the at least one matching edge and the location of the at least one edge in the intermediate decoded image) may be modified. Alternatively, when a pixel density of a given display or projector is 30 pixels per degree, pixel values for 5 pixels (that are interposed between the location of the at least one matching edge and the location of the at least one edge in the intermediate decoded image) may be modified.

Likewise, in another example, when a pixel density of a given display or projector is 50 pixels per degree, optical depth values of 8 pixels may be modified. Alternatively, when a pixel density of a given display or projector is 25 pixels per degree, optical depth values of 4 pixels may be modified.

The "encoded data" comprises an encoded input image and encoded depth information.

Optionally, the data processing arrangement is configured to encode the input image and the depth information into the encoded data in a lossy manner. In this regard, the data processing arrangement is configured to employ a lossy encoding algorithm to encode the input image and the depth information.

Optionally, the data processing arrangement is configured to:
- obtain intermediate decoded depth information by decoding intermediate encoded depth information obtained from intermediate encoding of the depth information;
- identify, in the intermediate decoded depth information, errors that correspond to the at least one depth edge; and
- modify the pixel values in the input image and/or the optical depths in the depth information, based on the errors that correspond to the at least one depth edge.

The term "intermediate encoded depth information" refers to depth information that is obtained upon intermediately encoding the depth information, whereas the term "intermediate decoded depth information" refers to depth information that is obtained upon intermediately decoding the intermediate encoded depth information. It will be appreciated that encoding the depth information to obtain the intermediate encoded depth information, and decoding the intermediate encoded depth information to obtain the intermediate decoded depth information are optionally performed as intermediate processing steps in the overall process of encoding implemented by the encoder.

Optionally, the data processing arrangement is configured to intermediately encode the depth information into the intermediate encoded depth information in a lossy manner. Optionally, in this regard, the data processing arrangement employs a lossy encoding algorithm to generate the intermediate encoded depth information. Notably, some optical depth detail of the depth information is lost while generating the intermediate encoded depth information in the lossy manner. Correspondingly, the intermediate decoded depth information has some errors that correspond to the at least one depth edge. The intermediate decoded depth information represents optical depths of the same objects as the depth information, but with some errors (in optical depth values) corresponding to the at least one depth edge, said errors arising out of the lossy manner of encoding used to obtain the intermediate encoded depth information.

It will be appreciated that the intermediate decoded depth information is an intermediate reconstruction of the depth information. Notably, the intermediate decoded depth information represents how the depth information would be reconstructed upon decoding, if the depth information were optionally encoded in a lossy manner. The intermediate decoded depth information is used in estimating possible inconsistencies that would arise between depth edges and edges of the objects in the encoded data if the input image and the depth information were encoded in a conventional manner.

Optionally, the data processing arrangement is configured to compare optical depths in the intermediate decoded depth information with the optical depths in the depth information to identify the errors that correspond to the at least one depth edge. An error corresponding to the at least one depth edge is identified when optical depths of pixels along depth edges in the intermediate decoded depth information do not match the optical depths of pixels along the at least one depth edge in the depth information.

Optionally, the pixel values in the input image and/or the optical depths in the depth information are modified, based on the errors that correspond to the at least one depth edge, to compensate for possible optical depth errors corresponding to the at least one depth edge that would occur on encoding the depth information in a lossy manner without said modification. Said modification enables consistency between the depth edges and the edges of the objects, in the decoded data.

Optionally, the data processing arrangement is configured to intermediately decode the intermediate encoded depth information into the intermediate decoded depth information in a lossy manner. In such a case, additional errors corresponding to the at least one depth edge would be introduced in the intermediate decoded depth information on account of the lossy manner of decoding. Alternatively, optionally, the data processing arrangement is configured to intermediately decode the intermediate encoded depth information into the intermediate decoded depth information in a lossless manner or a near lossless manner.

Optionally, the data processing arrangement is configured to encode the depth information into the encoded data in a lossless manner or a near lossless manner. Optionally, in this regard, data processing arrangement employs a lossless encoding algorithm or a near lossless encoding algorithm to encode the encode the depth information into the encoded data. When the depth information is encoded in the lossless manner or the near lossless manner, the encoded depth information includes pixel-accurate depth edges. In other words, optical depths in the encoded depth information match or nearly match the optical depths in the depth information, as optical depth detail is not lost while encoding the depth information into the encoded data.

It will be appreciated that when the depth information is encoded into the encoded data in the lossless manner or the near lossless manner, modifications (if any) of the optical depths in depth information would be effectively retained upon encoding the depth information, and subsequently, decoding the encoded data.

Optionally, the pixel values in the input image and/or the optical depths in the depth information are modified, such that a difference in a location of at least one given edge identified in a given decoded image corresponding to the at least one matching edge in the input image and a location of at least one given depth edge identified in given decoded depth information corresponding to the at least one depth edge satisfies a second predefined criterion, wherein the given decoded image and the given decoded depth information are obtained by decoding the encoded data.

Optionally, in this regard, the encoded data is decoded to yield the given decoded image and the given decoded depth information. The "given decoded image" refers to an image that is reconstructed upon decoding the encoded input image, whereas the "given decoded depth information" refers to depth information that is reconstructed upon decoding the encoded depth information. It will be appreciated that the decoding of the encoded data to obtain the given decoded image and the given decoded depth information is optionally performed at the encoder, to approximately reconstruct how the encoded data would be decoded by the decoder.

Optionally, the data processing arrangement is configured to compare attributes of edges in the given decoded image with attributes of the at least one matching edge in the input image, to identify the at least one given edge in the given decoded image that corresponds to the at least one matching edge. Similarly, optionally, the data processing arrangement is configured to compare attributes of depth edges in the given decoded depth information with attributes of the at least one depth edge in the depth information, to identify the at least one given depth edge in the given decoded depth information that corresponds to the at least one depth edge.

Optionally, the second predefined criterion is satisfied when the location of the at least one given edge identified in the given decoded image matches the location of the at least one given depth edge identified in the given decoded depth information. More optionally, the second predefined criterion is satisfied when the difference in the location of the at least one given edge identified in the given decoded image and the location of the at least one given depth edge identified in the given decoded depth information lies in a range of zero pixels to ten pixels. When said difference is not equal to zero pixels, there may be at least one of: offset, rotation, skewing, of the at least one given edge identified in the given decoded image with respect to the at least one given depth edge identified in the given decoded depth information. When the second predefined criterion is satisfied, the locations of the at least one given edge and the at least one given depth edge are exactly or nearly-exactly consistent.

It will be appreciated that possible pixel value errors and optical depth errors are optionally compensated for in a manner that the second predefined criterion is satisfied, by modifying the pixel values in the input image and/or the optical depths in the depth information prior to encoding, so that cross modal consistency of such errors is maintained across the encoded data, and also across the given decoded image and the given decoded depth information.

Optionally, the pixel values in the input image and/or the optical depths in the depth information are modified iteratively, until the second predefined criterion is satisfied. A single iteration or a plurality of iterations may be required to modify the pixel values and/or the optical depths to an extent that the second predefined criterion is satisfied.

Optionally, the data processing arrangement is configured to include, in the encoded data, residual information indicative of at least one of:
 errors in the given decoded image with respect to the input image,
 errors in the given decoded depth information with respect to the depth information.

Optionally, the residual information is utilized by the decoder to decode the encoded data.

Optionally, the residual information is utilized to determine error compensation that is required to be implemented for the encoded data, to minimize errors in the given decoded image and the given decoded depth information. It will be appreciated that the residual information enables the decoder to decode the encoded data to near-original levels. In particular, the residual information enables the decoder to decode the encoded data in a manner that the given decoded image is substantially similar to the input image, while the given decoded depth information is substantially similar to the depth information.

Optionally, the pixel values in the input image and/or the optical depths in the depth information are modified iteratively. Such iterative modification allows for iteratively updating (by modification) the pixel values in the input image and/or the optical depths for minimizing pixel value errors in the encoded data. At each iteration, an intermediate reconstruction of the input image is examined for pixel value errors, and the pixel values in the input image and/or the optical depths in the depth information are modified to compensate for said pixel value errors.

Optionally, at a given iteration, the data processing arrangement is configured to:
 obtain a given intermediate decoded image by decoding a given intermediate encoded image obtained from intermediate encoding of the input image;
 analyze the given intermediate decoded image to identify edges of objects represented in the given intermediate decoded image and to determine locations of the edges in the given intermediate decoded image;
 determine at least one edge from amongst the edges identified in the given intermediate decoded image that corresponds to the at least one matching edge in the input image; and
 modify pixel values in the input image and/or optical depths in the depth information, based on a difference in a location of the at least one edge in the given intermediate decoded image and the location of the at least one matching edge in the input image.

It will be appreciated that the pixel values in the input image and/or the optical depths in the depth information are optionally modified iteratively over a plurality of iterations. In such a case, there are obtained a plurality of given intermediate decoded images to enable gradual iterative modification of the pixel values in the input image and/or the optical depths in the depth information across the plurality of iterations. At every iteration, its corresponding given intermediate decoded images is utilized to identify possible pixel value errors and to accordingly determine the required modification.

Optionally, the data processing arrangement is configured to:
 analyze transparency information pertaining to the input image to identify transparency edges and to determine locations of the transparency edges;
 select, from amongst the transparency edges, at least one matching transparency edge whose location matches with the location of the at least one depth edge;
 obtain intermediate decoded transparency information by decoding intermediate encoded transparency information obtained from intermediate encoding of the transparency information;
 analyze the intermediate decoded transparency information to identify transparency edges and to determine locations of the transparency edges;
 determine at least one transparency edge from amongst the transparency edges identified in the intermediate decoded transparency information that corresponds to the at least one matching transparency edge;
 modify transparency values in the transparency information, based on a difference in a location of the at least one transparency edge identified in the intermediate decoded transparency information and the location of the at least one matching transparency edge identified in the transparency information; and
 encode the transparency information, upon modification of the transparency values, to assemble into the encoded data.

Throughout the present disclosure, the "transparency information" pertaining to the input image refers to information indicative of transparencies of the objects and the portions of the objects represented in the input image.

Optionally, the transparency information pertaining to the input image is in form of a transparency map. Throughout the present disclosure, the term "transparency map" refers to a data structure comprising the transparency information. In an embodiment, the transparency map is an array of transparency values associated with the input image, wherein a given element of the array corresponds to a transparency value of a given pixel of the input image, the given pixel representing a given object or a portion of the given object. In another embodiment, the transparency map is a transparency image comprising a plurality of pixels, wherein a colour of each pixel indicates transparency of its corresponding region within the input image.

Optionally, when analysing the transparency information, the data processing arrangement is configured to identify the transparency edges as edges in the transparency information at which transparency values of contiguous pixels changes abruptly.

Throughout the present disclosure, the term "matching transparency edge" refers to a transparency edge in the transparency information whose location matches with the location of the at least one depth edge.

Throughout the present disclosure, the term "intermediate encoded transparency information" refers to transparency information that is obtained upon intermediately encoding the transparency information, whereas the term "intermediate decoded transparency information" refers to transparency information that is obtained upon intermediately decoding the intermediate encoded transparency information. It will be appreciated such intermediate encoding and intermediate decoding are performed as intermediate processing steps in an overall process of encoding implemented by the encoder.

Optionally, the data processing arrangement is configured to intermediately encode the transparency information into the intermediate encoded transparency information in a lossy manner. As a result, the intermediate decoded transparency information has some transparency value errors. The transparency value errors arise out of the lossy manner of encoding used to obtain the intermediate encoded transparency information.

Throughout the present disclosure, the "transparency value" of a given pixel refers to a measure of transparency of the given pixel. The transparency value of the given pixel indicates the transparency of the given pixel, in a manner analogous to how pixel value of a given pixel indicates colour and brightness of the given pixel. Optionally, the transparency value of a given pixel lies within a range of 0 to 1. Optionally, in this regard, the transparency value being equal to 0 indicates opacity (namely, 0 percent transparency) of the given pixel, while the transparency value being equal to 1 indicates 100 percent transparency of the given pixel. As an example, the transparency value of the given pixel may be 0.4, meaning that the given object has 40 percent transparency.

Optionally, the data processing arrangement is configured to compare transparency values in the intermediate decoded transparency information with the transparency values in the transparency information to identify at least one transparency value error in the intermediate decoded transparency information.

It will be appreciated that the intermediate decoded transparency information is an intermediate reconstruction of the transparency information. Notably, the intermediate decoded transparency information represents how the transparency information would be reconstructed upon decoding, if the transparency information were optionally encoded in a lossy manner. The intermediate decoded transparency information is used in estimating possible inconsistencies that would arise between depth edges and transparency edges in the encoded data if the transparency information and the depth information were encoded in a conventional manner.

Optionally, the data processing arrangement is configured to employ at least one edge detection algorithm to identify the transparency edges in the intermediate decoded transparency information.

Optionally, the data processing arrangement is configured to compare attributes of the transparency edges identified in the intermediate decoded transparency information with attributes of the at least one matching transparency edge, wherein a given transparency edge in the intermediate decoded transparency information is determined to correspond to a given matching transparency edge when the given transparency edge and the given matching transparency edge have at least one matching attribute.

Optionally, when the location of the at least one transparency edge does not match the location of the at least one matching transparency edge, the transparency values in the transparency information are modified to compensate for said mismatch. When the transparency information would be encoded in a lossy manner without said modification, the transparency edges and their corresponding depth edge(s) would be inconsistent (due to possible transparency value errors that are introduced at the time of encoding). This modification of the transparency values is an error-compensation data processing operation that is made prior to encoding the transparency information and the depth information to generate the encoded data. It will be appreciated that said modification enables consistency between the depth edges and the transparency edges.

Optionally, when the transparency information is encoded, upon modification of the transparency values, the encoded data is compensated for possible transparency value errors. Optionally, in this regard, the encoded data further comprises encoded transparency information. Optionally, the data processing arrangement is configured to encode the transparency information in a lossy manner.

Optionally, the data processing arrangement is configured to:
 obtain intermediate decoded depth information by decoding intermediate encoded depth information obtained from intermediate encoding of the depth information;
 identify, in the intermediate decoded depth information, errors that correspond to the at least one depth edge; and
 modify the transparency values in the transparency information, based on the errors that correspond to the at least one depth edge.

Optionally, the transparency values in the transparency information are modified, based on the errors that correspond to the at least one depth edge, to compensate for possible optical depth errors corresponding to the at least one depth edge that would occur on encoding the depth information in a lossy manner without said modification. Said modification enables consistency between the depth edges and the transparency edges, in the decoded data.

Optionally, the transparency values in the transparency information are modified, such that a difference in a location of at least one given transparency edge identified in given decoded transparency information corresponding to the at least one matching transparency edge and a location of at least one given depth edge identified in given decoded depth information corresponding to the at least one depth edge satisfies a third predefined criterion, wherein the given decoded transparency information and the given decoded depth information are obtained by decoding the encoded data.

Optionally, in this regard, the encoded data is decoded to yield the given decoded transparency information and the given decoded depth information. The "given decoded transparency information" refers to transparency information that is reconstructed upon decoding the encoded transparency information. It will be appreciated that the decoding of the encoded data to obtain the given decoded transparency information and the given decoded depth information is optionally performed at the encoder, to approximately reconstruct how the encoded data would be decoded by the decoder.

Optionally, the data processing arrangement is configured to compare attributes of transparency edges in the given decoded transparency information with attributes of the at least one matching transparency edge in the transparency information, to identify the at least one given transparency edge in the given decoded transparency information that corresponds to the at least one matching edge.

Optionally, the third predefined criterion is satisfied when the location of the at least one given transparency edge identified in the given decoded transparency information matches the location of the at least one given depth edge identified in the given decoded depth information. When the third predefined criterion is satisfied, the locations of the at least one given transparency edge and the at least one given depth edge are consistent. In such a case, possible transparency value errors and optical depth errors are compensated for, by modifying the transparency values in the transparency information prior to encoding, so that cross modal consistency of such errors is maintained across the encoded data, and across the given decoded transparency information and the given decoded depth information.

Optionally, the transparency values in the transparency information are modified iteratively, until the third predefined criterion is satisfied.

It will be appreciated that various embodiments and variants disclosed above with respect to the input image apply mutatis mutandis to the transparency information.

Optionally, the residual information is further indicative of errors in the given decoded transparency information with respect to the transparency information. In such a case, the residual information enables the decoder to decode the encoded transparency information to near-original levels of transparency values in the transparency information.

Optionally, the encoder is communicably coupled to the decoder. Optionally, in this regard, the data processing arrangement is further configured to communicate the encoded data to the decoder.

In some implementations, the decoder is optionally communicably coupled to the encoder, via a direct connection. The direct connection is wired, wireless, or a combination of both.

In other implementations, the decoder is optionally communicably coupled to the encoder, via a communication network.

In yet other implementations, the decoder is optionally communicably coupled to the encoder, via a data server and/or a data repository. In such a case, the encoded data is communicated from the encoder to the data server and/or the data repository, and then communicated from the data server and/or the data repository to the decoder. In these implementations, the decoder may: directly access the encoded data from the data server and/or the data repository; stream the encoded data from the data server and/or the data repository, via a communication network or a direct connection; or retrieve the encoded data from the data server and/or the data repository via a non-transitory (namely non-transient) computer-readable storage medium, such as a hard drive, an optical disc and/or a Solid-State Drive (SSD).

Throughout the present disclosure, the term "decoder" refers to specialized equipment that, in operation, decodes data. In particular, the decoder decodes the encoded data that is generated by the encoder. The encoded data is decoded to generate final reconstructions of original unencoded data (namely, the input image and the depth information in their original form).

Optionally, the decoder comprises data processing hardware configured to decode the encoded data to generate decoded data. Optionally, the decoded data comprises a final decoded image and final decoded depth information. Herein, the term "final" has been used to distinguish outputs of a decoding operation performed at the decoder from outputs of intermediate decoding operations performed at the encoder.

In an embodiment, the data processing hardware is configured to decode the encoded data into the decoded data in a lossy manner. In such a case, the data processing hardware employs a lossy decoding algorithm to generate the decoded data. In another embodiment, the data processing hardware is configured to decode the encoded data into the decoded data in a lossless manner or a near lossless manner. In such a case, the data processing hardware employs a lossless decoding algorithm or a near lossless decoding algorithm to generate the decoded data.

Optionally, the data processing hardware of the decoder is implemented by employing at least one Reduced Instruction Set Computing (RISC) processor that is operable to execute data processing operations pertaining to decoding.

According to an embodiment, a display apparatus or an external computing device associated with the display apparatus comprises the decoder. Optionally, the external computing device comprises at least one external processor. Herein, the term "display apparatus" refers to a specialized equipment that is configured to present an extended-reality (XR) environment to a user when the display apparatus in operation is worn by the user on his/her head. In such an instance, the display apparatus acts as a device (for example, such as an XR headset, a pair of XR glasses, and the like) that is operable to present a visual scene of the XR environment to the user. Commonly, the "display apparatus" is referred to as "head-mounted display apparatus", for the sake of convenience only.

Throughout the present disclosure, the term "extended-reality" encompasses virtual reality, augmented reality, mixed reality, and the like.

Optionally, the display apparatus comprises at least one display or projector, means for tracking a pose of the user's head, and a processor coupled to the at least one display or projector and said means, wherein the processor or the at least one external processor communicably coupled to the processor is configured to:
  process head-tracking data obtained from said means to determine a current head pose of the user and a velocity and/or acceleration with which the head pose is changing;
  predict, based on the current head pose, future head poses of the user;
  process the final decoded image, based on the future head poses and the final decoded depth information, to generate at least one warped output image to be rendered; and
  render, via the at least one display or projector, the at least one warped output image.

Throughout the present disclosure, the term "pose" encompasses both "position" and "orientation".

Optionally, when processing the final decoded image to generate the at least one warped output image, the processor is configured to employ at least one image reprojection algorithm. The at least one image reprojection algorithm comprises at least one of: a timewarping algorithm, a spacewarping algorithm. The at least one image reprojection algorithm takes into account a plurality of factors for generating the at least one warped output image. The plurality of factors comprise, for example, a resolution of the at least one display or projector, a frame rate of rendering the at least one warped output image, a total latency from a time of generating head-tracking data to a time of generating the at least one warped output image, and the like. Image reprojection algorithms are well-known in the art.

Throughout the present disclosure, the "at least one warped output image" refers to "at least one timewarped output image", "at least one spacewarped output image" or "at least one timewarped and spacewarped output image".

It will be appreciated that the at least one warped image exhibits pixel value and depth consistencies. In this regard, the at least one warped image also exhibits cross modal consistency of pixel value errors, and optionally, optical depth errors. Therefore, the at least one warped image does not suffer from bleeding of incorrect pixel values across objects lying at different optical depths. As a result, the objects in the at least one warped image are not undesirably stretched or distorted.

Throughout the present disclosure, the term "means for tracking the pose of the user's head" refers to specialized equipment for detecting and/or tracking the pose of the user's head within an environment (in which the user is positioned). The means for tracking the pose of the user's head could be implemented as at least one of: an optics-based positioning system (which utilizes, for example, infrared beacons and detectors, visible-light cameras, and the like), an acoustics-based positioning system, a radio-based positioning system, a magnetism-based positioning system, an Inertial Measurement Unit (IMU). Such means for tracking the pose of the user's head are well-known in the art.

Optionally, when the transparency information is encoded and assembled into the encoded data, the decoded data (generated upon decoding the encoded data) further comprises final decoded transparency information.

Optionally, the processor or the at least one external processor communicably coupled to the processor is further configured to process the final decoded image, based on the future head poses, the final decoded depth information, and the final decoded transparency information, to generate the at least one warped image to be rendered.

According to another embodiment, a processing unit associated with the three-dimensional display comprises the decoder. Optionally, the processing unit is configured to process the final decoded image, based on the final decoded depth information, to generate a three-dimensional image to be displayed via the three-dimensional display. In such a case, required pixel values are displayed for objects at required optical depths in the three-dimensional image, as the pixel values (and pixel value errors) in the final decoded image are consistent with the optical depths (and optionally, optical depth errors) in the final decoded depth information. This consistency is due to the specialized data processing operations (pertaining to generation of the encoded data) performed by the data processing arrangement at the time of encoding the input image and the depth information to generate the encoded data. Without generating the encoded data in the aforesaid manner, incorrect pixel values would have been displayed for objects at different optical depths in the three-dimensional image. Optionally, when generating the three-dimensional image, the processing unit is configured to further process the final decoded image, based on the final decoded transparency information.

The present disclosure also relates to the method as described above. Various embodiments and variants disclosed above apply mutatis mutandis to the method.

Optionally, the method further comprises:
  obtaining intermediate decoded depth information by decoding intermediate encoded depth information obtained from intermediate encoding of the depth information;
  identifying, in the intermediate decoded depth information, errors that correspond to the at least one depth edge; and
  modifying the pixel values in the input image and/or the optical depths in the depth information, based on the errors that correspond to the at least one depth edge.

Optionally, in the method, the depth information is encoded into the encoded data in a lossless manner or a near lossless manner.

Optionally, in the method, the pixel values in the input image and/or the optical depths in the depth information are modified, such that a difference in a location of at least one given edge identified in a given decoded image corresponding to the at least one matching edge in the input image and a location of at least one given depth edge identified in given decoded depth information corresponding to the at least one depth edge satisfies a second predefined criterion, wherein the given decoded image and the given decoded depth information are obtained by decoding the encoded data.

Optionally, in the method, the pixel values in the input image and/or the optical depths in the depth information are modified iteratively.

Optionally, the method further comprises:
  analyzing transparency information pertaining to the input image to identify transparency edges and to determine locations of the transparency edges;
  selecting, from amongst the transparency edges, at least one matching transparency edge whose location matches with the location of the at least one depth edge;
  obtaining intermediate decoded transparency information by decoding intermediate encoded transparency information obtained from intermediate encoding of the transparency information;
  analyzing the intermediate decoded transparency information to identify transparency edges and to determine locations of the transparency edges;
  determining at least one transparency edge from amongst the transparency edges identified in the intermediate decoded transparency information that corresponds to the at least one matching transparency edge;
  modifying transparency values in the transparency information, based on a difference in a location of the at least one transparency edge identified in the intermediate decoded transparency information and the location of the at least one matching transparency edge identified in the transparency information; and
  encoding the transparency information, upon modification of the transparency values, to assemble into the encoded data.

Optionally, the method further comprises:
  obtaining intermediate decoded depth information by decoding intermediate encoded depth information obtained from intermediate encoding of the depth information;

identifying, in the intermediate decoded depth information, errors that correspond to the at least one depth edge; and modifying the transparency values in the transparency information, based on the errors that correspond to the at least one depth edge.

Optionally, in the method, the transparency values in the transparency information are modified, such that a difference in a location of at least one given transparency edge identified in given decoded transparency information corresponding to the at least one matching transparency edge and a location of at least one given depth edge identified in given decoded depth information corresponding to the at least one depth edge satisfies a third predefined criterion, wherein the given decoded transparency information and the given decoded depth information are obtained by decoding the encoded data.

DETAILED DESCRIPTION OF THE DRAWINGS

Figure 2:
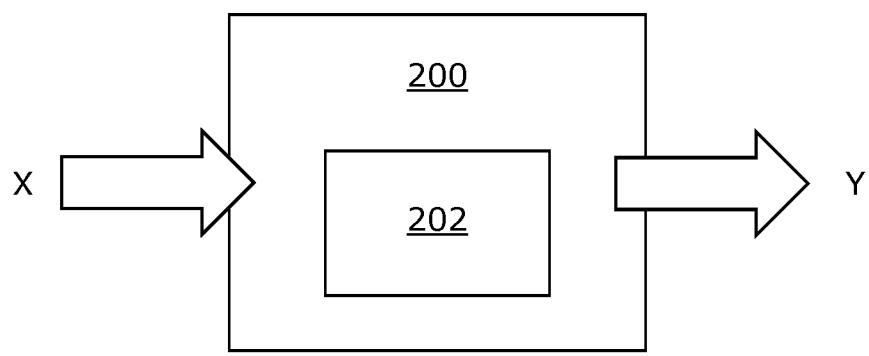
FIG. 2 is a schematic illustration of an encoder, in accordance with an embodiment of the present disclosure.

Referring to FIG. 2, illustrated is a schematic illustration of an encoder 200, in accordance with an embodiment of the present disclosure. The encoder 200 comprises a data processing arrangement 202. The data processing arrangement 202 is configured to:

analyze depth information pertaining to an input image to identify at least one depth edge at which a change in a function of an optical depth satisfies a first predefined criterion and to determine a location of the at least one depth edge, wherein the depth information is indicative of optical depths of objects and portions of the objects represented in the input image;

analyze the input image to identify edges of the objects represented in the input image and to determine locations of the edges in the input image;

select, from amongst the edges identified in the input image, at least one matching edge in the input image whose location matches with the location of the at least one depth edge;

obtain an intermediate decoded image by decoding an intermediate encoded image obtained from intermediate encoding of the input image;

analyze the intermediate decoded image to identify edges of objects represented in the intermediate decoded image and to determine locations of the edges in the intermediate decoded image;

determine at least one edge from amongst the edges identified in the intermediate decoded image that corresponds to the at least one matching edge in the input image;

modify pixel values in the input image and/or optical depths in the depth information, based on a difference in a location of the at least one edge in the intermediate decoded image and the location of the at least one matching edge in the input image; and encode the input image and the depth information (collectively depicted as 'X'), upon modification of the pixel values in the input image and/or the optical depths in the depth information, to generate encoded data (depicted as 'Y').

Figure 3:
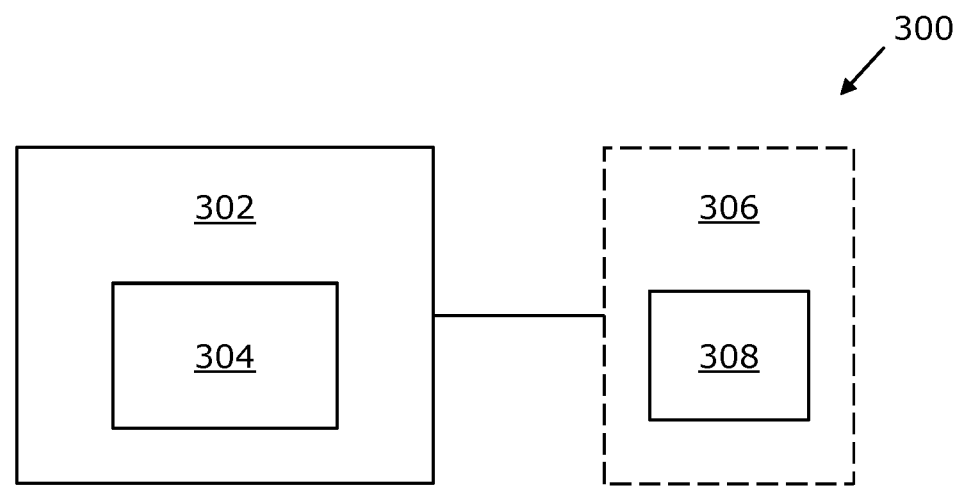
FIG. 3 is a schematic illustration of an environment in which an encoder is employed, in accordance with an embodiment of the present disclosure.

Referring to FIG. 3, illustrated is a schematic illustration of an environment 300 in which an encoder 302 is employed, in accordance with an embodiment of the present disclosure. The encoder 302 comprises a data processing arrangement 304. The encoder 302 is communicably coupled to a decoder 306. The decoder 306 is communicably coupled to the encoder 302 via a direct connection, a communication network (not shown) or a data server (not shown) and/or a data repository (not shown). The data processing arrangement 304 of the encoder 302 performs data processing operations pertaining to data encoding, to generate encoded data. The decoder 306 comprises data processing hardware 308 configured to decode the encoded data to generate decoded data.

Figure 4A:
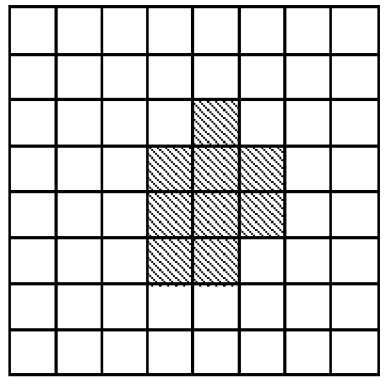
FIG. 4A is an illustration of a final decoded image that is generated upon decoding an encoded input image.
Figure 4B:
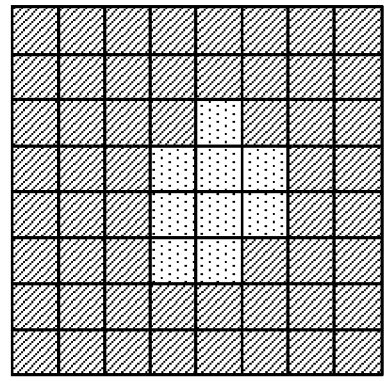
FIG. 4B is an illustration of final decoded depth information that is generated upon decoding encoded depth information.
Figure 4C:
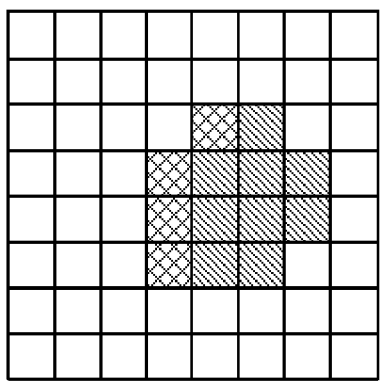
Figure 4D:
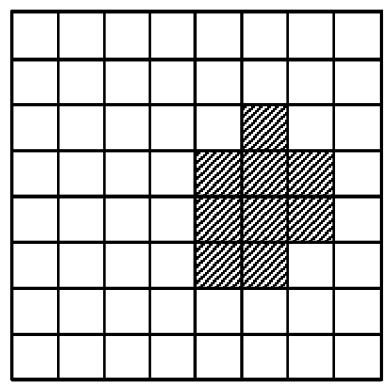
FIG. 4D is an illustration of the warped output image, the warped output image being generated based on the final decoded image and the final decoded depth information, in accordance with an embodiment of the present disclosure.

Referring to FIGS. 4A-4D, FIG. 4A is an illustration of a final decoded image that is generated upon decoding an encoded input image; FIG. 4B is an illustration of final decoded depth information that is generated upon decoding encoded depth information; FIG. 4C is an illustration of how a warped output image is to be generated for a given head pose of a user; while FIG. 4D is an illustration of the warped output image, the warped output image being generated based on the final decoded image and the final decoded depth information, in accordance with an embodiment of the present disclosure.

In FIG. 4A, the final decoded image represents a circular object in its central portion and a background in its remaining portion. The final decoded image is generated upon decoding the encoded input image, wherein the encoded input image is generated in a manner that pixel values in an input image are modified prior to encoding the input image to generate the encoded input image. The input image is encoded in a lossless manner to generate the encoded input image. In the final decoded image, pixels having slanting hatches represent the circular object, whereas pixels having no hatches (notably, blank pixels) represent the background.

In FIG. 4B, the final decoded depth information represents optical depths of the circular object and the background. The optical depth of the circular object is depicted by way of dotted hatched pixels, whereas the optical depth of the background is depicted by way of slanting hatched pixels, the optical depth of the background being greater than the optical depth of the circular object. The final decoded depth information is generated upon decoding the encoded depth information, wherein the encoded depth information is generated upon encoding depth information pertaining to the input image in a lossy manner. The final decoded depth information includes optical depth errors along a left depth edge of the circular object, the optical depth errors being introduced upon encoding the depth information in the lossy manner.

Notably, the pixel values in the input image are modified, prior to encoding the input image and the depth information, to match a left edge of the circular object in the final decoded image of FIG. 4A with the left depth edge of the circular object in the final decoded depth information of FIG. 4B. The modification is done to compensate the encoded input image for possible depth errors that would arise along the left depth edge of the circular object upon the lossy manner of encoding the depth information. As a result of the modification, object edges in the (losslessly) encoded input image are consistent with depth edges in the (lossily) encoded depth information. Consequently, object edges in the final decoded image are consistent with (and compensated for errors in) depth edges in the final decoded depth information.

In FIG. 4C, it can be noted that for the given head pose, the circular object and the background are offset towards the right. As a result, there emerge pixels (depicted as cross hatched pixels) for which pixel values are to be filled in, as these pixels were occluded (behind the circular object) in the final decoded image.

In FIG. 4D, in the warped output image, the pixel values of the cross hatched pixels of FIG. 4C are filled in using pixel values in the final decoded image, based on optical depths in the final decoded depth information. The pixel values of the cross hatched pixels are determined to be equal to pixel values of pixels lying on a left side of the cross hatched pixels, as optical depths of the cross hatched pixels would be similar to optical depths of the pixels lying on the left side of the cross hatched pixels (when taking into account the offset and optical depths in the final decoded depth information). The pixel values of the cross hatched pixels are filled correctly, as the object edges in the final decoded image are consistent with depth edges in the final decoded depth information. Such correct filling-in of the pixel values mitigates undesirable stretching of the circular object in the warped output image. As a result, a shape of the circular object in the warped output image is similar to a shape of the object represented in the final decoded image, and is also consistent with the final decoded depth information.

It may be understood by a person skilled in the art that the FIGS. 4A, 4B, 4C and 4D are merely example illustrations for sake of clarity, which should not unduly limit the scope of the claims herein. The person skilled in the art will recognize many variations, alternatives, and modifications of embodiments of the present disclosure.

Figure 5A:
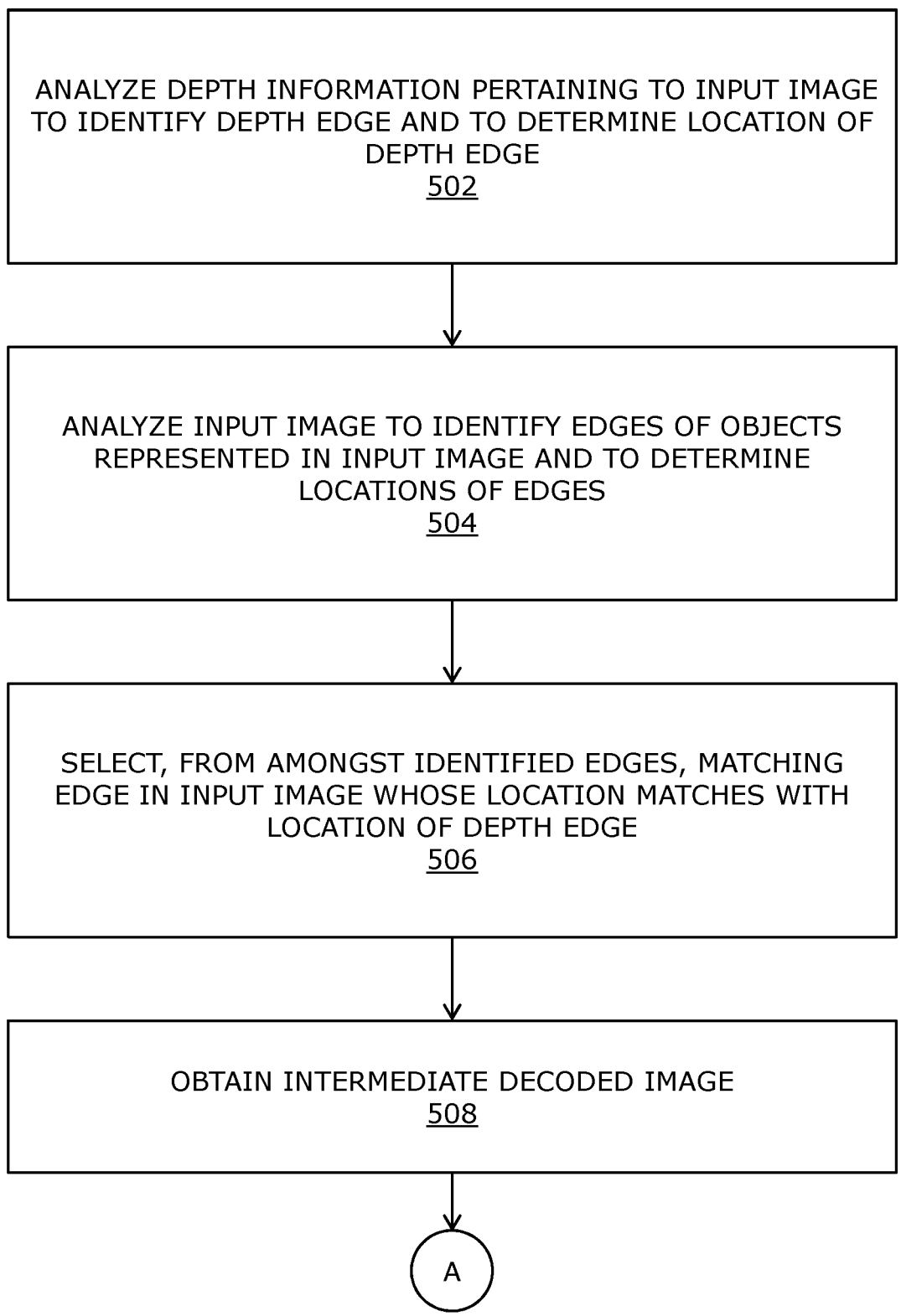
FIGS. 5A and 5B illustrate steps of a method, in accordance with an embodiment of the present disclosure.
Figure 5B:
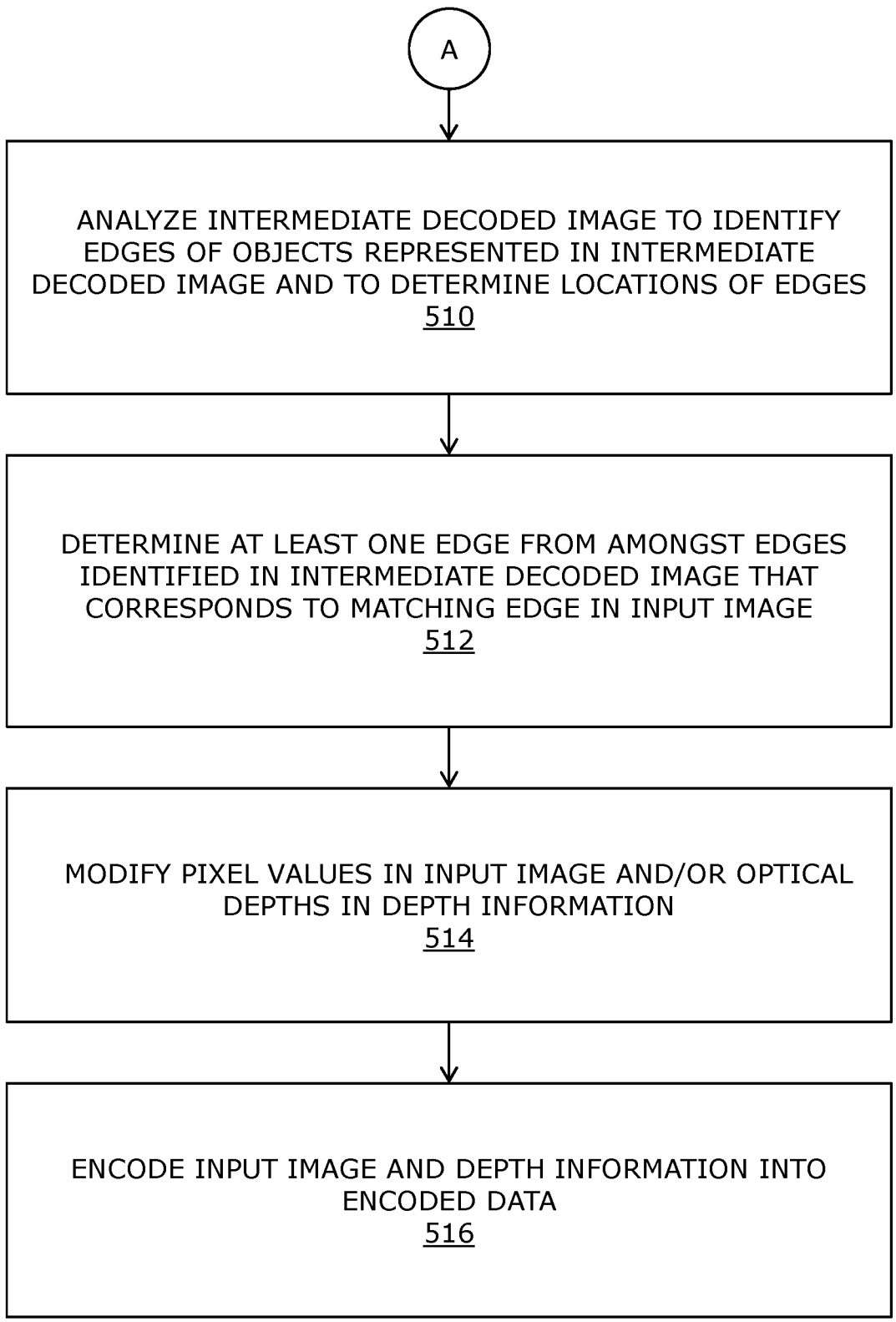

Referring to FIGS. 5A and 5B, illustrated are steps of a method, in accordance with an embodiment of the present disclosure. At step 502, depth information pertaining to an input image is analyzed to identify at least one depth edge at which a change in a function of an optical depth satisfies a first predefined criterion and to determine a location of the at least one depth edge. The depth information is indicative of optical depths of objects and portions of the objects represented in the input image. At step 504, the input image is analyzed to identify edges of the objects represented in the input image and to determine locations of the edges in the input image. At step 506, there is selected, from amongst the edges identified in the input image, at least one matching edge in the input image whose location matches with the location of the at least one depth edge. At step 508, an intermediate decoded image is obtained by decoding an intermediate encoded image obtained from intermediate encoding of the input image. At step 510, the intermediate decoded image is analyzed to identify edges of objects represented in the intermediate decoded image and to determine locations of the edges in the intermediate decoded image. At step 512, there is determined at least one edge from amongst the edges identified in the intermediate decoded image that corresponds to the at least one matching edge in the input image. At step 514, pixel values in the input image and/or optical depths in the depth information are modified, based on a difference in a location of the at least one edge in the intermediate decoded image and the location of the at least one matching edge in the input image. At step 516, the input image and the depth information are encoded, upon modification of the pixel values in the input image and/or the optical depths in the depth information, into encoded data.

The steps 502 to 516 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. An encoder comprising a data processing arrangement configured to:
    analyze depth information pertaining to an input image to identify at least one depth edge at which a change in a function of an optical depth satisfies a first predefined criterion and to determine a location of the at least one depth edge, wherein the depth information is indicative of optical depths of objects and portions of the objects represented in the input image;
    analyze the input image to identify edges of the objects represented in the input image and to determine locations of the edges in the input image;
    select, from amongst the edges identified in the input image, at least one matching edge in the input image whose location matches with the location of the at least one depth edge;
    obtain an intermediate decoded image by decoding an intermediate encoded image obtained from intermediate encoding of the input image;
    analyze the intermediate decoded image to identify edges of objects represented in the intermediate decoded image and to determine locations of the edges in the intermediate decoded image;
    determine at least one edge from amongst the edges identified in the intermediate decoded image that corresponds to the at least one matching edge in the input image;
    modify pixel values in the input image and/or optical depths in the depth information, based on a difference in a location of the at least one edge in the intermediate decoded image and the location of the at least one matching edge in the input image; and
    encode the input image and the depth information, upon modification of the pixel values in the input image and/or the optical depths in the depth information, to generate encoded data.

2. The encoder of claim 1, wherein the data processing arrangement is configured to:
    obtain intermediate decoded depth information by decoding intermediate encoded depth information obtained from intermediate encoding of the depth information;
    identify, in the intermediate decoded depth information, errors that correspond to the at least one depth edge; and
    modify the pixel values in the input image and/or the optical depths in the depth information, based on the errors that correspond to the at least one depth edge.

3. The encoder of claim 1, wherein the data processing arrangement is configured to encode the depth information into the encoded data in a lossless manner or a near lossless manner.

4. The encoder of claim 1, wherein the pixel values in the input image and/or the optical depths in the depth information are modified, such that a difference in a location of at least one given edge identified in a given decoded image corresponding to the at least one matching edge in the input image and a location of at least one given depth edge identified in given decoded depth information corresponding to the at least one depth edge satisfies a second predefined criterion, wherein the given decoded image and the given decoded depth information are obtained by decoding the encoded data.

5. The encoder of claim 1, wherein the pixel values in the input image and/or the optical depths in the depth information are modified iteratively.

6. The encoder of claim 1, wherein the data processing arrangement configured to:
analyze transparency information pertaining to the input image to identify transparency edges and to determine locations of the transparency edges;
select, from amongst the transparency edges, at least one matching transparency edge whose location matches with the location of the at least one depth edge;
obtain intermediate decoded transparency information by decoding intermediate encoded transparency information obtained from intermediate encoding of the transparency information;
analyze the intermediate decoded transparency information to identify transparency edges and to determine locations of the transparency edges;
determine at least one transparency edge from amongst the transparency edges identified in the intermediate decoded transparency information that corresponds to the at least one matching transparency edge;
modify transparency values in the transparency information, based on a difference in a location of the at least one transparency edge identified in the intermediate decoded transparency information and the location of the at least one matching transparency edge identified in the transparency information; and
encode the transparency information, upon modification of the transparency values, to assemble into the encoded data.

7. The encoder of claim 6, wherein the data processing arrangement is configured to:
obtain intermediate decoded depth information by decoding intermediate encoded depth information obtained from intermediate encoding of the depth information;
identify, in the intermediate decoded depth information, errors that correspond to the at least one depth edge; and
modify the transparency values in the transparency information, based on the errors that correspond to the at least one depth edge.

8. The encoder of claim 6, wherein the transparency values in the transparency information are modified, such that a difference in a location of at least one given transparency edge identified in given decoded transparency information corresponding to the at least one matching transparency edge and a location of at least one given depth edge identified in given decoded depth information corresponding to the at least one depth edge satisfies a third predefined criterion, wherein the given decoded transparency information and the given decoded depth information are obtained by decoding the encoded data.

9. A method comprising:
analyzing depth information pertaining to an input image to identify at least one depth edge at which a change in a function of an optical depth satisfies a first predefined criterion and to determine a location of the at least one depth edge, wherein the depth information is indicative of optical depths of objects and portions of the objects represented in the input image;
analyzing the input image to identify edges of the objects represented in the input image and to determine locations of the edges in the input image;
selecting, from amongst the edges identified in the input image, at least one matching edge in the input image whose location matches with the location of the at least one depth edge;
obtaining an intermediate decoded image by decoding an intermediate encoded image obtained from intermediate encoding of the input image;
analyzing the intermediate decoded image to identify edges of objects represented in the intermediate decoded image and to determine locations of the edges in the intermediate decoded image;
determining at least one edge from amongst the edges identified in the intermediate decoded image that corresponds to the at least one matching edge in the input image;
modifying pixel values in the input image and/or optical depths in the depth information, based on a difference in a location of the at least one edge in the intermediate decoded image and the location of the at least one matching edge in the input image; and
encoding the input image and the depth information, upon modification of the pixel values in the input image and/or the optical depths in the depth information, into encoded data.

10. The method of claim 9, further comprising:
obtaining intermediate decoded depth information by decoding intermediate encoded depth information obtained from intermediate encoding of the depth information;
identifying, in the intermediate decoded depth information, errors that correspond to the at least one depth edge; and
modifying the pixel values in the input image and/or the optical depths in the depth information, based on the errors that correspond to the at least one depth edge.

11. The method of claim 9, wherein the depth information is encoded into the encoded data in a lossless manner or a near lossless manner.

12. The method of claim 9, wherein the pixel values in the input image and/or the optical depths in the depth information are modified, such that a difference in a location of at least one given edge identified in a given decoded image corresponding to the at least one matching edge in the input image and a location of at least one given depth edge identified in given decoded depth information corresponding to the at least one depth edge satisfies a second predefined criterion, wherein the given decoded image and the given decoded depth information are obtained by decoding the encoded data.

13. The method of claim 9, wherein the pixel values in the input image and/or the optical depths in the depth information are modified iteratively.

14. The method of claim 9, further comprising:
analyzing transparency information pertaining to the input image to identify transparency edges and to determine locations of the transparency edges;
selecting, from amongst the transparency edges, at least one matching transparency edge whose location matches with the location of the at least one depth edge;
obtaining intermediate decoded transparency information by decoding intermediate encoded transparency information obtained from intermediate encoding of the transparency information;
analyzing the intermediate decoded transparency information to identify transparency edges and to determine locations of the transparency edges;

determining at least one transparency edge from amongst the transparency edges identified in the intermediate decoded transparency information that corresponds to the at least one matching transparency edge;

modifying transparency values in the transparency information, based on a difference in a location of the at least one transparency edge identified in the intermediate decoded transparency information and the location of the at least one matching transparency edge identified in the transparency information; and encoding the transparency information, upon modification of the transparency values, to assemble into the encoded data.

15. The method of claim 14, further comprising:

obtaining intermediate decoded depth information by decoding intermediate encoded depth information obtained from intermediate encoding of the depth information;

identifying, in the intermediate decoded depth information, errors that correspond to the at least one depth edge; and modifying the transparency values in the transparency information, based on the errors that correspond to the at least one depth edge.

16. The method of claim 14, wherein the transparency values in the transparency information are modified, such that a difference in a location of at least one given transparency edge identified in given decoded transparency information corresponding to the at least one matching transparency edge and a location of at least one given depth edge identified in given decoded depth information corresponding to the at least one depth edge satisfies a third predefined criterion, wherein the given decoded transparency information and the given decoded depth information are obtained by decoding the encoded data.

* * * * *